(12) United States Patent
Olsson

(10) Patent No.: US 11,634,824 B2
(45) Date of Patent: Apr. 25, 2023

(54) DEVICE FOR PERFORMING ELECTROLYSIS OF WATER, AND A SYSTEM THEREOF

(71) Applicant: Epinovatech AB, Lund (SE)

(72) Inventor: Martin Andreas Olsson, Lund (SE)

(73) Assignee: Epinovatech AB, Lund (SE)

( * ) Notice: Subject to any disclaimer, the term of this patent is extended or adjusted under 35 U.S.C. 154(b) by 0 days.

(21) Appl. No.: 17/835,804

(22) Filed: Jun. 8, 2022

(65) Prior Publication Data

US 2022/0396886 A1 Dec. 15, 2022

(30) Foreign Application Priority Data

Jun. 9, 2021 (EP) ..................... 21178453

(51) Int. Cl.
*C25B 1/04* (2021.01)
*C25B 9/23* (2021.01)
(Continued)

(52) U.S. Cl.
CPC .................. *C25B 1/04* (2013.01); *C25B 9/23* (2021.01); *C25B 9/50* (2021.01); *C25B 11/046* (2021.01);
(Continued)

(58) Field of Classification Search
CPC ........... C25B 1/04; C25B 9/50; C25B 11/049; C25B 1/02–1/044; C25B 1/55
See application file for complete search history.

(56) References Cited

U.S. PATENT DOCUMENTS 2,463,073 A 3/1949 Webb
4,103,325 A 7/1978 Hyman et al.
(Continued)

FOREIGN PATENT DOCUMENTS

CN 101621292 5/2012
CN 103477418 12/2013
(Continued)

OTHER PUBLICATIONS

Dahal et al ("Realizing InGaN monolithic solarphotoelectrochemical cells for artificial Photosynthesis", Applied Physics Letters, 104, 2014, pp. 143901-1-143901-3) (Year: 2014).*
(Continued)

*Primary Examiner* — Alexander W Keeling
(74) *Attorney, Agent, or Firm* — Knobbe, Martens, Olson & Bear, LLP

(57) ABSTRACT

A device for performing electrolysis of water is disclosed. The device may include a semiconductor structure with a surface and an electron guiding layer below said surface, the electron guiding layer of the semiconductor structure being configured to guide electron movement in a plane parallel to the surface. The electron guiding layer of the semiconductor structure may include an InGaN quantum well or a heterojunction, the heterojunction being a junction between AlN material and GaN material or between AlGaN material and GaN material and at least one metal cathode arranged on the surface of the semiconductor structure. The device may further include at least one photoanode arranged on the surface of the semiconductor structure, wherein the at least one photoanode may include a plurality of quantum dots of $In_xGa_{(1-x)}N$ material, wherein $0.4 \leq x \leq 1$. A system including such a device is also disclosed.

16 Claims, 5 Drawing Sheets

(51) Int. Cl.
  *C25B 11/049*  (2021.01)
  *C25B 11/046*  (2021.01)
  *C25B 9/50*   (2021.01)
  *G01N 27/414* (2006.01)

(52) U.S. Cl.
  CPC ........ *C25B 11/049* (2021.01); *G01N 27/4141* (2013.01)

(56) References Cited

U.S. PATENT DOCUMENTS

| | | |
|---|---|---|
| 4,873,497 A | 10/1989 | Kielmeyer |
| 7,250,359 B2 | 7/2007 | Fitzgerald |
| 9,275,857 B1 | 3/2016 | Hersee |
| 9,379,204 B2 | 6/2016 | Fogel et al. |
| 11,469,300 B2 | 10/2022 | Olsson |
| 2003/0165418 A1 | 9/2003 | Ajayan |
| 2005/0159000 A1* | 7/2005 | Ohno ................. H01L 21/3081 438/689 |
| 2006/0134883 A1 | 6/2006 | Hantschel |
| 2006/0189018 A1 | 8/2006 | Yi |
| 2007/0108435 A1 | 5/2007 | Harmon |
| 2007/0215899 A1 | 9/2007 | Thomas |
| 2007/0295993 A1 | 12/2007 | Chen et al. |
| 2008/0122418 A1 | 5/2008 | Biere et al. |
| 2008/0153000 A1 | 6/2008 | Salot et al. |
| 2008/0171424 A1 | 7/2008 | Li |
| 2009/0269909 A1 | 10/2009 | Kim |
| 2010/0176459 A1 | 7/2010 | Wernersson et al. |
| 2010/0259186 A1 | 10/2010 | Ernoux |
| 2010/0276664 A1 | 11/2010 | Hersee |
| 2010/0314617 A1 | 12/2010 | Ito |
| 2011/0020704 A1 | 1/2011 | Fukuchi |
| 2011/0036396 A1 | 2/2011 | Jayaraman |
| 2011/0140072 A1 | 6/2011 | Varangis |
| 2011/0143472 A1 | 6/2011 | Seifert |
| 2012/0001153 A1 | 1/2012 | Hersee |
| 2012/0235117 A1 | 9/2012 | Takashi et al. |
| 2013/0061747 A1* | 3/2013 | Turnbull ............ B01D 53/0454 96/111 |
| 2013/0175501 A1 | 7/2013 | Hersee |
| 2013/0187627 A1 | 7/2013 | Imada et al. |
| 2014/0008609 A1 | 1/2014 | Chiu |
| 2014/0134773 A1 | 5/2014 | Rakesh et al. |
| 2014/0197130 A1 | 7/2014 | Lemke |
| 2014/0231870 A1 | 8/2014 | Hoke |
| 2015/0014631 A1 | 1/2015 | Ohlsson |
| 2015/0060996 A1 | 3/2015 | Colinge |
| 2015/0076450 A1 | 3/2015 | Weman |
| 2015/0084685 A1 | 3/2015 | Hirose et al. |
| 2015/0118572 A1 | 4/2015 | Lund et al. |
| 2015/0311072 A1 | 10/2015 | Aagesen |
| 2015/0333216 A1 | 11/2015 | Pourquire |
| 2016/0172305 A1 | 6/2016 | Sato |
| 2016/0276433 A1 | 9/2016 | Holland |
| 2017/0002471 A1* | 1/2017 | Okamoto ................. C25B 9/73 |
| 2017/0062213 A1 | 3/2017 | Patolsky |
| 2017/0110332 A1 | 4/2017 | Beveridge |
| 2017/0257025 A1 | 9/2017 | Meiser |
| 2017/0323788 A1 | 11/2017 | Mi |
| 2019/0081164 A1 | 3/2019 | Shrivastava |
| 2019/0284706 A1 | 9/2019 | Takeda et al. |
| 2019/0356278 A1 | 11/2019 | Smith |
| 2019/0393104 A1 | 12/2019 | Ando |
| 2021/0265632 A1 | 8/2021 | Olsson |
| 2021/0327712 A1 | 10/2021 | Olsson |
| 2022/0231298 A1 | 7/2022 | Olsson |
| 2022/0302293 A1 | 9/2022 | Olsson |

FOREIGN PATENT DOCUMENTS

| | | |
|---|---|---|
| CN | 106549050 | 3/2017 |
| CN | 110336028 | 3/2021 |
| EP | 2571065 | 3/2013 |
| EP | 2816729 | 12/2014 |
| EP | 284700 | 1/2015 |
| GB | 2520687 | 6/2015 |
| JP | 2008057383 | 3/2008 |
| JP | 2014217252 | 11/2014 |
| WO | WO 95/08452 | 3/1995 |
| WO | WO 2010/100599 | 9/2010 |
| WO | WO 2012/105901 | 8/2012 |
| WO | WO 2017/111844 | 6/2017 |
| WO | WO 2017/213644 | 12/2017 |

OTHER PUBLICATIONS

Chebrolu et al ("Recent progress in quantum dot sensitized solar cells: an inclusive review of photoanode, sensitizer, electrolyte, and the counter electrode", Journal of Materials Chemistry C, 2019, 7, 4911-4933) (Year: 2019).*

Kumar et al ("Quantum dot activated indium gallium nitride on silicon as photoanode for solar hydrogen generation", Communication Chemistry, 2019, pp. 1-7). (Year: 2019).*

Enthaler et al ("Carbon dioxide and formic acid—the couple for environmental-friendly hydrogen storage?", Energy & Environmental Science, 2010, 3, 1207-1217). (Year: 2010).*

Faunce et al ("Nanotechnology, Plasma, Hydrogen from Artificial Photosynthesis, and Fuel Cells: Powering the Developing World to the Sustainocene", Nanotechnology Toward the Sustainocene, 2015, pp. 241-257). (Year: 2015).*

Gust et al ("Solar Fuels via Artificial Photosynthesis", Accounts of Chemical Research, 2009, vol. 42, No. 12, pp. 1890-1898). (Year: 2009).*

Ramakrishna et al ("Nitrogen doped CNTs supported Palladium electrocatalyst for hydrogen evolution reaction in PEM water electrolyser", International Journal of Hydrogen Energy, 41, 2016, pp. 20447-20454). (Year: 2016).*

Alamo et al., III-V CMOS: the key to sub-10 nm electronics?, Microsystems Technology Laboratories, MIT, 2011 MRS Spring Meeting and Exhibition Symposium P: Interface Engineering for Post-CMOS Emerging Channel Materials.

Nainani, "High-Performance III-V PMOSFET", May 2011, in 131 pages.

Sundaram et al, "Single-crystal nanopyramidal BGaN by nanoselective area growth on AlN/Si(111) and GaN templates"., Nanotechnology, vol. 27 (2016) 7 pages.

Tripathy et al., "AlGaN/GaN two-dimensional-electron gas heterostructures on 200 mm diameter Si(111)", Applied Physics Letters, 101, 082110 (2012) https://doi.org/10.1063/1.4746751 Submitted: Feb. 7, 2012 , Accepted: Aug. 1, 2012 , Published Online: Aug. 23, 2012.

Wang et al., Germanium-Assisted Direct Growth of Graphene on Arbitrart Dielectric Substrates for Heating Device, Nano Micro Small, vol. 13, No. 28 Jul. 26, 2017.

Asghar Asgari, "Negative Differential Capacitance of AlGaN/GaN Heterostructure in Presence of InN Quantum Dots", SPIE, PO Box 10 Bellingham WA 98227-0010 USA, Jan. 1, 2008.

Fujii et al., "Photoelectrochemical Properties of Ingan for H2 Generation From Aqueous Water", Japanese Journal of Applied Physics, Japan Society of Applied Physics, JP, vol. 44, No. 10, Oct. 11, 2005 (Oct. 11, 2005), pp. 7473-7435.

Naveed ul Hassan Alvi et al., "InN/InGaN Quantum Dot Photoelectrode: Efficient Hydrogen Generation by Water Splitting at Zero Voltage", Nano Energy, vol. 13, Mar. 6, 2015 (Mar. 6, 2015), pp. 291-297.

Anonymous, "High-electron-mobility transistor—Wikipedia", Mar. 6, 2020 (Mar. 6, 2020), XP055808423, Retrieved from the Internet: URL:https://en.wikipedia.org/w/index.php?title=High-electron-mobility transistor&old id=944233239, retrieved on May 27, 2021 6 pages.

Anonymous, "Phase-shift oscillator Wikipedia" Apr. 7, 2019 (Apr. 7, 2019), XP055733459, Retrieved from the Internet: URL:https://en.wikipedia.org/w/index.php?title=Phase-shift- oscillator&oldid-89138949 5, retrieved on Sep. 23, 2020 in 3 pages.

Cai et al, Monolithically Integrated Enhancement-and Depletion-Mode AlGaN/GaN HEMT for gaN Digital Integrated Circuits, vol. 53, No. 9, Sep. 1, 2006 (Sep. 1, 2006), pp. 2223-2230.

(56) References Cited

OTHER PUBLICATIONS

Mukhopadhyay, P. "Comparative DC Characteristic Analysis of AlGaN/GaN HEMTs Grown on Si(111) and Sapphire Substrates by MBE" Jour. of Elec. Mat. vol. 43, No. 4, Feb. 14, 2014 pp. 1263-1270 (Year: 2014).

Park, J. "Comparison of AlGaN/GaN High Electron Mobility Transistor with AlN or GaN as a cap layer" Conference paper proceedings on Research Gate available online at address recited in the Office Action dated Jul. 14, 2015 pp. 1-2 (Year: 2015).

Shibata, D. "1.7 kV/1.0 mQcm2 Normally-off Vertical GaN Transistor on GaN substrate with Regrown p-GaN/AlGaN/GaN SemipolarGate Structure" IEEE Int. Elec. Dev. Meet. IEDM 2016, Feb. 2, 2017 pp. 248-251 (Year: 2016).

Sritoma et al., IIA Novel GaN-Hemt based Inverter and Cascade Amplifier 11 , 2018 IEEE Electron Devices Kolkata Conference (EDKCON), IEEE, Nov. 24, 2018 (Nov. 24, 2018), pp. 465-469.

Tavares et al., "Implementation of a high frequency PWM signal in FPGA for GaN power devices switching", 2017 Brazilian Power Electronics Conference (COBEP), IEEE, Nov. 19, 2017 (Nov. 19, 2017), pp. 1-7.

\* cited by examiner

DEVICE FOR PERFORMING ELECTROLYSIS OF WATER, AND A SYSTEM THEREOF

TECHNICAL FIELD

The present inventive concept relates, in general, to a device for performing electrolysis of water and a system comprising said device.

BACKGROUND

Hydrogen gas can be used as a clean fuel. It may e.g. be used in fuel cells to produce electrical current wherein the waste products may mainly comprise water. Hydrogen gas may be produced by performing electrolysis of water e.g. by photo-electrolytic cells. However, current devices for performing electrolysis of water leave room for improvements.

SUMMARY

It is an objective of the inventive concept to enable electrolysis of water. It is a further objective of the inventive concept to enable energy-efficient and/or cost-efficient electrolysis of water. It is a further objective of the inventive concept to enable environmentally friendly electrolysis of water. It is a further objective of the inventive concept to enable generation of current from hydrogen produced by electrolysis of water. These and other objectives of the inventive concept are at least partly met by the invention as defined in the independent claims. Preferred embodiments are set out in the dependent claims.

According to a first aspect there is provided a device for performing electrolysis of water, the device comprising: a semiconductor structure comprising a surface and an electron guiding layer below said surface, the electron guiding layer of the semiconductor structure being configured to guide electron movement in a plane parallel to the surface, the electron guiding layer of the semiconductor structure comprising an InGaN quantum well or a heterojunction, the heterojunction being a junction between AlN material and GaN material or between AlGaN material and GaN material; at least one metal cathode arranged on the surface of the semiconductor structure; and at least one photoanode arranged on the surface of the semiconductor structure, wherein the at least one photoanode comprises a plurality of quantum dots of $In_xGa_{(1-x)}N$ material, wherein $0.4 \leq x \leq 1$.

Such a device may perform electrolysis of water in an energy-efficient and/or cost-efficient way. The device may be configured to, when in operation and when the at least one metal cathode and the at least one photoanode are immersed in water and illuminated by sunlight: absorb sunlight by the at least one photoanode to create photoexcited electrons in the at least one photoanode; and guide said photoexcited electrons from the at least one photoanode, via the electron guiding layer, to the at least one metal cathode.

Thus, the device may be configured to, when in operation, provide a path for electron transport from the at least one photoanode, via the electron guiding layer, to the at least one metal cathode. The device may herein be configured to, when in operation, allow electron tunneling from the at least one photoanode to the electron guiding layer. The device may herein be configured to, when in operation, allow electron tunneling from the electron guiding layer to the at least one metal cathode. The electron guiding layer may be configured to guide electron movement from the at least one photoanode to the at least one metal cathode. The electron guiding layer is configured to guide electron movement in a plane parallel to the surface. Thus, the electron guiding layer may be a layer allowing electron movements in a plane parallel to the surface and restricting electron movements out of the plane.

The photoexcited electrons may be electrons in the conduction band of the at least one photoanode. The creation of the photoexcited electrons in the at least one photoanode may simultaneously create holes. The holes may be holes in the valence band of the at least one photoanode. Holes in the valence band of the at least one photoanode may be transferred to the water in which the semiconductor structure is immersed to create hydrogen ions. Thus, when the device is in operation, oxygen gas and hydrogen ions may be formed at the at least one photoanode according to:

$$(\text{anode}) \; H_2O \rightarrow \frac{1}{2}O_2 + 2H^+ + 2e^-$$

The hydrogen ions may then travel through the water in which the semiconductor structure is immersed to the at least one metal cathode to pick up electrons and form hydrogen gas according to $$(\text{cathode}) \; 2H^+ + 2e^- \rightarrow H_2$$

Thus, the device may be configured to perform the electrolysis of water to produce: oxygen gas, at the at least one photoanode, and hydrogen gas, at the at least one metal cathode. Since water may have a low electrical conductance, an electrolyte may advantageously be used for the full reaction $$H_2O \rightarrow \frac{1}{2}O_2 + H_2$$

to take place. The hydrogen ions and hydroxide ions get transported by the electric field between the anode and the cathode where the anode and cathode half-reactions take place.

It may be advantageous to perform the electrolysis of water on salt water, e.g. sea water, as salt water may comprise a high concentration of ions. Thus, the at least one photoanode, and the at least one metal cathode may be configured to be immersible in salt water. Similarly, the semiconductor structure may be configured to be immersible in salt water.

The quantum dots may be semiconductor structures small enough to exhibit quantum mechanical energy quantization. The quantum dots may have sizes smaller than 150×150×100 nm, such as smaller than 100×100×10 nm. The quantum dots may exhibit full energy quantization, i.e. charge carriers within the quantum dots may be confined in all three dimensions. Quantum dots may thus be seen as zero-dimensional structures which may have a higher density of states than e.g. one-dimensional structures (e.g. quantum wires), or two-dimensional structures (e.g. quantum wells), or three-dimensional structures (e.g. bulk structures). A high density of states may provide efficient absorption of sunlight. A high density of states may additionally or alternatively enhance the generation of electron-hole pairs for the water splitting.

Quantum dots of $In_xGa_{(1-x)}N$ material may have the advantage that they provide a large energy gap between electron and hole energy levels. The energy gap may depend on both the bandgap of the $In_xGa_{(1-x)}N$ material and on quantum confinement. An energy gap of at least 1.23 eV may be required for electrolysis of water. In many situations it may be advantageous with an energy gap larger than 1.23 eV. Further, $In_xGa_{(1-x)}N$ material may be stable against photo-corrosion which may lead to a stable device which does not degrade with time. A similar material system, InGaPN, has e.g. been shown to be stable against photo-corrosion, as is described in Journal of The Electrochemical Society, 155, 9, B903-6907, 2008.

Such stable devices may be cost-efficient as they may not need to be replaced often. It is a realization of the inventor that transfer of ions in the water may be rate limiting for the electrolysis of water. Thus, in a device with the at least one metal cathode and the at least one photoanode being arranged on the same semiconductor structure, the distance for the ions to travel may be small. This may result in efficient ion transport and thereby efficient production of hydrogen gas.

Further, having the at least one metal cathode and the at least one photoanode arranged on the same semiconductor structure may facilitate a compact device. Further, having the at least one metal cathode and the at least one photoanode arranged on the same semiconductor structure may facilitate a low production cost as fewer parts may be needed for the device.

It is a realization of the inventor that an electron guiding layer comprising an InGaN quantum well, or an AlN/GaN heterojunction, or an AlGaN/GaN heterojunction, may effectively guide electrons from the at least one photoanode to the at least one metal cathode. This may result in efficient electron transport and thereby efficient production of hydrogen gas.

An InGaN quantum well may confine, e.g. quantum mechanically confine, the electrons in one dimension and may therefore be seen as a two-dimensional structure. The quantum well may have a thickness comparable with the de Broglie wavelength of electrons in the conduction band of the InGaN. Electrons within the InGaN quantum well may form a two-dimensional electron gas (2DEG). Due to the confinement the mobility of the electrons within the InGaN quantum well may be high, which may contribute to efficient electron transport.

Similarly, a 2DEG may be created at an AlN/GaN heterojunction, or an AlGaN/GaN heterojunction through e.g. spontaneous and/or piezoelectric polarization at the junction, or through modulation doping. The term heterojunction refers to a junction between two materials of different bandgaps. AlN or AlGaN may have a larger bandgap than GaN. The term AlN/GaN heterojunction refers to a junction between AlN material and GaN material. The term AlGaN/GaN heterojunction refers to a junction between AlGaN material and GaN material. The junction may herein be the interface between the two materials of different bandgaps. Band bending in the conduction band at the AlN/GaN heterojunction, or the AlGaN/GaN heterojunction, may confine electrons to the junction to create the 2DEG. The device may be configured such that when the semiconductor structure is immersed in water, the quantum dots of $In_xGa_{(1-x)}N$ material are in contact with water. Thus, charges may be exchanged at the quantum dot to water interface, as part of the electrolysis process.

The quantum dots of $In_xGa_{(1-x)}N$ material may be configured to have an energy gap of at least 1.23 eV. The quantum dots of $In_xGa_{(1-x)}N$ material may be configured to have an energy gap of at least 1.6 eV. The quantum dots of $In_xGa_{(1-x)}N$ material may be configured to have an energy gap in the range of 1.6 eV to 2.4 eV. This may provide efficient light absorption.

The quantum dots of $In_xGa_{(1-x)}N$ material may be configured to have a conduction band edge that is higher than the redox potential of hydrogen. The quantum dots of $In_xGa_{(1-x)}N$ material may be configured to have a valence band edge that is lower than the redox potential of oxidation of water. The quantum dots of $In_xGa_{(1-x)}N$ material may be configured to have a bandgap or energy gap that straddles the redox potentials of water splitting. The quantum dots of $In_xGa_{(1-x)}N$ material may be configured to have a conduction band edge and a valence band edge aligned with the redox potential of water oxidation. The quantum dots of $In_xGa_{(1-x)}N$ material may be configured to have a conduction band edge aligned with the hydrogen reaction potential.

The device may comprise a metal contact, wherein the device is configured to apply a first electrical potential to the at least one photoanode via the metal contact, and to apply a second electrical potential to the at least one metal cathode, the first and second potential being different.

Thus, there may be a potential difference between the at least one photoanode and the at least one metal cathode. The first and second electrical potential may be configured such that the potential difference is at least 1.23 V.

The metal contact may comprise a nickel-gold-alloy and be configured to make ohmic contact to the semiconductor structure. Such a metal contact may prevent a large potential drop at an interface between the metal contact and the semiconductor structure. Thus, such a metal contact may enable an energy efficient device.

It is a realization that the electrical potential of a photoanode or a metal cathode may be screened by ions in the water. A measure of electrical screening in an electrolyte may be the Debye length. Within one Debye length an electrical potential may be screened by a factor 1/e. In seawater the Debye length may be approximately 10 nm. Thus, it may be advantageous to configure the device such that ions, e.g. $H^+$ ions, travelling between a photoanode and a metal cathode does not need to travel more than a threshold distance or such that ions travelling between a photoanode and a metal cathode on average does not need to travel more than a threshold distance. The threshold distance may be e.g. 10 nm, 20 nm, or 50 nm.

The device may be configured such that each photoanode of the at least one photoanode is within a threshold distance of a metal cathode of the at least one metal cathode. The threshold distance may be e.g. 10 nm, 20 nm, or 50 nm.

In the device, each quantum dot of the at least one photoanode may represent a shortest QD-to-cathode distance, the shortest QD-to-cathode distance being a shortest distance from the quantum dot to the nearest metal cathode of the at least one metal cathode. The device may be configured such that an average of the shortest QD-to-cathode distances of the quantum dots of the at least one photoanode is 10 nm or less. Alternatively, the device may be configured such that an average of the shortest QD-to-cathode distances of the quantum dots of the at least one photoanode is 20 nm or less. Alternatively, the device may be configured such that an average of the shortest QD-to-cathode distances of the quantum dots of the at least one photoanode is 50 nm or less.

The at least one metal cathode of the device may comprise nickel. Alternatively, or additionally, the at least one metal cathode of the device may comprise platinum. Such metal cathodes may make a good contact to the semiconductor structure, e.g. an ohmic contact. Such metal cathodes may be resistant to oxidation or degradation during the electrolysis process. Nickel may be a cheap metal which may facilitate a low price of the device.

The at least one metal cathode of the device may comprise palladium. Such metal cathodes may make a good contact to the semiconductor structure, e.g. an ohmic contact. Such metal cathodes may be resistant to oxidation or degradation during the electrolysis process.

Further, it is a realization that a metal cathode comprising a suitable metal, e.g. palladium or nickel, may enable nuclear reactions which may produce heat to drive a turbine and thereby produce electricity. Such generation of electricity may take place in parallel to the hydrogen production. Seawater may comprise ~1% heavy water that may be used for the nuclear reaction. Excess heat may be formed involving the heavy water and metal cathodes comprising palladium or nickel. The excess heat may be sufficient to boil water. For example, palladium may absorb up to 900 times its own volume of hydrogen used for such reactions to occur. In a metal cathode comprising palladium or nickel, deuterium atoms may be confined in vacancy-deuterium clusters to a high density. The palladium or nickel of the metal cathode may have a face centered cubic crystalline structure. A face centered cubic crystalline structure may be advantageous over other crystalline structures as it may absorb large amounts of deuterium without becoming too brittle.

Nickel may have the electron configuration $[Ar]3d^84s^2$ with a nearly full 3d shell but no room in the 4s shell. Palladium may be the only element in the periodic table with a full $d_n$ shell i.e. $4d^{10}$ and an empty $s_{n+1}$ or $5s^0$ shell in the ground state. It is thus recognized that deuterium atoms from heavy water may be attracted to the metal cathode, comprising palladium or nickel, and may react inside the crystalline lattice of the metal cathode. The heavy water reaction at a photoanode may be $2D_2O \rightarrow O_2 + 4D^+ + 4e^-$, and the reaction at a metal cathode may be $4D^+ + 4e^- \rightarrow 2D_2$. This nuclear reaction could potentially heat water that further creates electricity by driving a turbine.

A voltage applied to the photoanode and metal cathode immersed in heavy water and lithium salts such as $LiBF_4$, $LiPF_6$. $D_2O$ may then dissociated to $DO^-$ and $D^+$ ions. When the voltage is applied to the electrodes, the $DO^-$ may be attracted to the photoanode, where they lose the excess electron to form oxygen atoms and combine with other $DO^-$ ions to reform $D_2O$. The oxygen atoms may combine to form $O_2$ that escapes as a gas. The $D^+$ ions may be attracted to the negatively charged metal cathode and diffuse into the interatomic sites within the lattice. Other $D^+$ ions may collide and form $D^2$ molecules that are too big to enter the lattice and also escape as a gas. Applying high DC voltage may increase the loading of deuterium ions into the lattice. When the concentration of deuterium increases to saturation, the deuterium atoms may start to move collectively. Pairs of deuterium atoms may fuse together to form 4He isotope according to the reaction $D+D \rightarrow {}^4He+p$.

Applying the DC+ and DC− voltage to the metal cathode and the photoanode respectively may facilitate surface plasmons (polaritons) that are quantum of plasma oscillations created by the collective oscillation of electrons on a solid surface. This may be driving the $D^+$ ions in the lattice at room temperature which is negatively charged. Classically, the divergence of the Coulomb potential as the distance between deuterium atoms goes to zero would mean that at low energies, they cannot even stay extremely close to each other, or take part in a low energy nuclear reaction (LENR). By quantum tunneling the deuterium nuclei can tunnel past their mutual Coulomb barrier and fuse.

The electron guiding layer of the semiconductor structure of the device may comprise a superlattice of InGaN quantum wells, each InGaN quantum well of the superlattice having a bandgap, wherein the InGaN quantum wells of the superlattice are separated by semiconductor barrier material with a bandgap larger than the bandgap of the InGaN quantum wells of the superlattice. The superlattice of InGaN quantum wells may comprise at least two InGaN quantum wells separated by barrier material. A superlattice may have enhanced electron mobility compared to a single quantum well.

Further, the electron guiding layer of the semiconductor structure may comprise an InGaN quantum well with a thickness between 1 nm and 7 nm, such as e.g. between 3 nm and 5 nm. For example, the electron guiding layer of the semiconductor structure may comprise a single InGaN quantum well with a thickness between 1 nm and 7 nm. Alternatively, the electron guiding layer of the semiconductor structure may comprise a superlattice of InGaN quantum wells, wherein at least one of the InGaN quantum wells of the superlattice, e.g. all the InGaN quantum wells of the superlattice, has a thickness between 1 nm and 7 nm. Such a thickness may ensure that the electrons have a sufficient affinity for the InGaN quantum well. Thus, tunneling from the at least one photoanode to the electron guiding layer may be facilitated. The thickness may be a thickness measured in a direction orthogonal to the surface of the semiconductor structure.

Further, the electron guiding layer of the semiconductor structure may comprise an InGaN quantum well with a composition of $In_zGa_{(1-z)}N$, wherein $x \leq z$. Thus, the InGaN quantum well of the electron guiding layer of the semiconductor structure may be richer in indium than the plurality of quantum dots of the at least one photoanode. Such a composition may ensure that the $In_zGa_{(1-z)}N$ quantum well of the electron guiding layer has a lower bandgap than the at least one photoanode. Thus, tunneling from the at least one photoanode to the electron guiding layer may be facilitated.

For example, the electron guiding layer of the semiconductor structure may comprise a single $In_zGa_{(1-z)}N$ quantum well, wherein $x \leq z$. Alternatively, the electron guiding layer of the semiconductor structure may comprise a superlattice of InGaN quantum wells, wherein at least one of the InGaN quantum wells of the superlattice is an $In_zGa_{(1-z)}N$ quantum well, wherein $x \leq z$.

The device may be configured to provide a two-dimensional electron gas (2DEG) in the electron guiding layer of the semiconductor structure. The 2DEG may be provided within one individual InGaN quantum well, or within a superlattice of InGaN quantum wells, in the electron guiding layer of the semiconductor structure. Alternatively, the 2DEG may be provided at an AlN/GaN heterojunction or an AlGaN/GaN heterojunction in the electron guiding layer of the semiconductor structure. The 2DEG may be provided when the device is in operation. In some devices the 2DEG may additionally be provided also when the device is not in operation. The 2DEG may be an electron gas free to move in two dimensions but confined in the third dimension. The electron gas may be free to move in a plane parallel to the surface of the semiconductor structure.

It should be understood that devices in accordance with the first aspect wherein the plurality of quantum dots of $In_xGa_{(1-x)}N$ material is replaced by a plurality of quantum dots of $In_xGa_{(1-x)}NP$ material may have similar advantages as devices according to the first aspect.

Thus, advantages may be provided by:

A device for performing electrolysis of water, the device comprising: a semiconductor structure comprising a surface and an electron guiding layer below said surface, the electron guiding layer of the semiconductor structure being configured to guide electron movement in a plane parallel to the surface, the electron guiding layer of the semiconductor structure comprising an InGaN quantum well or a heterojunction, the heterojunction being a junction between AlN material and GaN material or between AlGaN material and GaN material; at least one metal cathode arranged on the surface of the semiconductor structure; and at least one photoanode arranged on the surface of the semiconductor structure, wherein the at least one photoanode comprises a plurality of quantum dots of $In_xGa_{(1-x)}NP$ material, wherein $0.4 \leq x \leq 1$.

According to a second aspect there is provided a system, the system comprising: a device according to the first aspect (or a device wherein the plurality of quantum dots of $In_xGa_{(1-x)}N$ material is replaced by a plurality of quantum dots of $In_xGa_{(1-x)}NP$ material); and a container configured to hold water, the container comprising a gas outlet. The device and the container are arranged such that when the container holds the water, the at least one metal cathode and the at least one photoanode of the device are immersed in the water. The system is configured such that when the device is in operation, and the at least one metal cathode and the at least one photoanode of the device are immersed in the water and illuminated by sunlight, a gas mixture flow is presented at the gas outlet of the container, wherein the gas mixture flow comprises oxygen gas and hydrogen gas from the electrolysis of water performed by the device. The system further comprising a gas filter configured to: receive the gas mixture flow from the gas outlet of the container; filter the gas mixture flow into a hydrogen gas flow; and present the hydrogen gas flow at a hydrogen outlet of the gas filter. The system further comprising a fuel cell configured to: receive the hydrogen gas flow from the hydrogen outlet of the gas filter; and react the received hydrogen gas flow with oxygen to generate an electrical current. Thus, the system may generate the electrical current from sunlight illuminating the semiconductor structure, e.g. illuminating the at least one photoanode arranged on the surface of the semiconductor structure.

The fuel cell may be configured to react the received hydrogen gas flow with oxygen from air. Alternatively, the system may be configured to filter out both oxygen and hydrogen from the gas mixture flow. In this case the gas filter may be further configured to: filter the gas mixture flow into an oxygen gas flow; present the oxygen gas flow at an oxygen outlet of the gas filter; and react the received hydrogen gas flow with oxygen from the received oxygen gas flow to generate the electrical current.

As the system generates hydrogen gas, part, or all of the hydrogen gas flow may be stored if the demand for electrical current is momentarily low.

As the at least one photoanode and the at least one metal cathode of the device may be close to each other, the hydrogen and oxygen gases from the at least one photoanode and the at least one metal cathode may mix. Thus, the gas filter of the system may provide an efficient way of separating the oxygen gas from the hydrogen gas.

The gas filter may be a pressure swing adsorption filter. A pressure swing adsorption filter may effectively separate the oxygen gas and the hydrogen gas. The pressure swing adsorption filter may comprise zeolite, e.g. zeolite with mesopores.

The fuel cell may be a proton-exchange membrane fuel cell. A proton-exchange membrane fuel cell may be advantageous for mobile applications, e.g. for vehicle applications as it may be compact.

The system according to the second aspect may have the same advantages, or similar advantages, as the device according to the first aspect and may possibly be the subject of a future divisional application.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
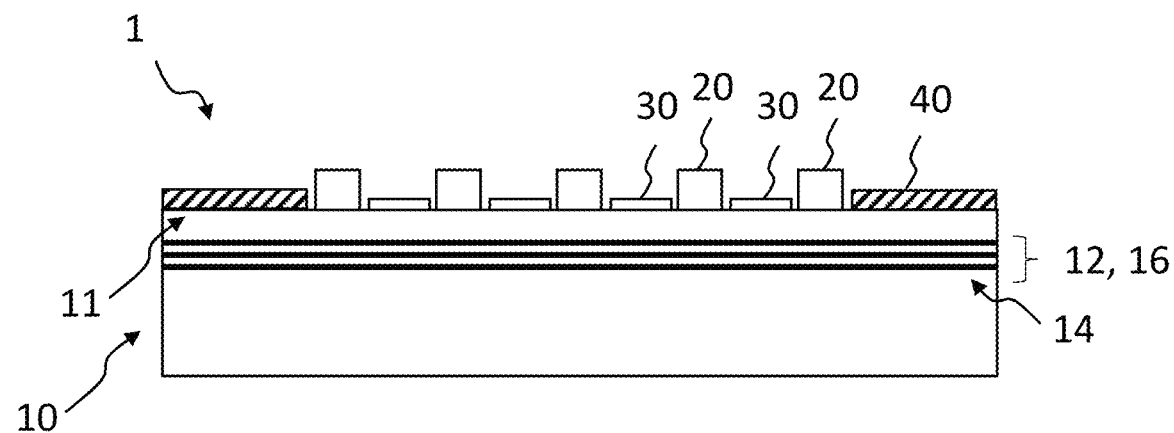
FIG. 1 is a cross-sectional view of a device.

FIG. 1 illustrates a cross-sectional view of a device 1 for performing electrolysis of water. The device 1 comprises a semiconductor structure 10 which may be a semiconductor chip, e.g. a semiconductor chip of nitride semiconductor material, e.g. group III-Nitride material. Group III-Nitride material may herein refer to one or more alloys of material from group III in the periodic table and nitrogen, e.g. GaN, AlN, AlGaN, InGaN, or InGaNP. The semiconductor structure 10 comprises a surface 11. The normal to the surface 11 may be the growth direction of the semiconductor structure 10, i.e. the direction in which the semiconductor structure 10 has been grown, e.g. epitaxially grown. The semiconductor structure 10 further comprises an electron guiding layer 12 below the surface 11. In the figure, the electron guiding layer 12 comprises a superlattice 16 of InGaN quantum wells 14. In the figure, the superlattice 16 comprises three InGaN quantum wells 14.

The illustrated device 1 further comprises metal cathodes 20, photoanodes 30, and metal contacts 40, arranged on the surface 11.

When the device 1 is in operation and the metal cathodes 20 and photoanodes 30 are in contact with water and the photoanodes 30 are illuminated by sunlight the device 1 may absorb sunlight by the photoanodes 30 to create photoexcited electrons in the photoanodes 30. The device 1 may then guide said photoexcited electrons from the photoanodes 30, via the electron guiding layer 12, to the metal cathodes 20. Thus, photoexcited electrons may move from a photoanode 30 into the semiconductor structure 10 to the electron guiding layer 12, then laterally within the electron guiding layer 12 towards a metal cathode 20, then out of the semiconductor structure 10 to the metal cathode 20. Simultaneously, ions may move within the water between the photoanode 30 to the metal cathode 20. For example, H⁺ ions may move from the photoanode 30 to the metal cathode 20.

At least one photoanode 30 comprises a plurality of quantum dots 32 of $In_xGa_{(1-x)}N$ material, wherein $0.4 \leq x \leq 1$. The quantum dots 32 may be in epitaxial connection to the semiconductor structure 10, e.g. as formed in Stranski-Krastanov or Volmer-Weber growth. Alternatively, the quantum dots 32 may be deposited on the semiconductor structure 10, e.g. colloidal quantum dots 32 deposited on the semiconductor structure 10. The quantum dots 32 may be free standing on the surface 11 of the semiconductor structure 10 or embedded or capped, e.g. embedded or capped in semiconductor material having a larger bandgap than the quantum dots 32. The formation of the plurality of quantum dots 32 may be a random process. Thus, the plurality of quantum dots 32 may be randomly arranged on the surface 11 of the semiconductor structure 10.

Figure 2:
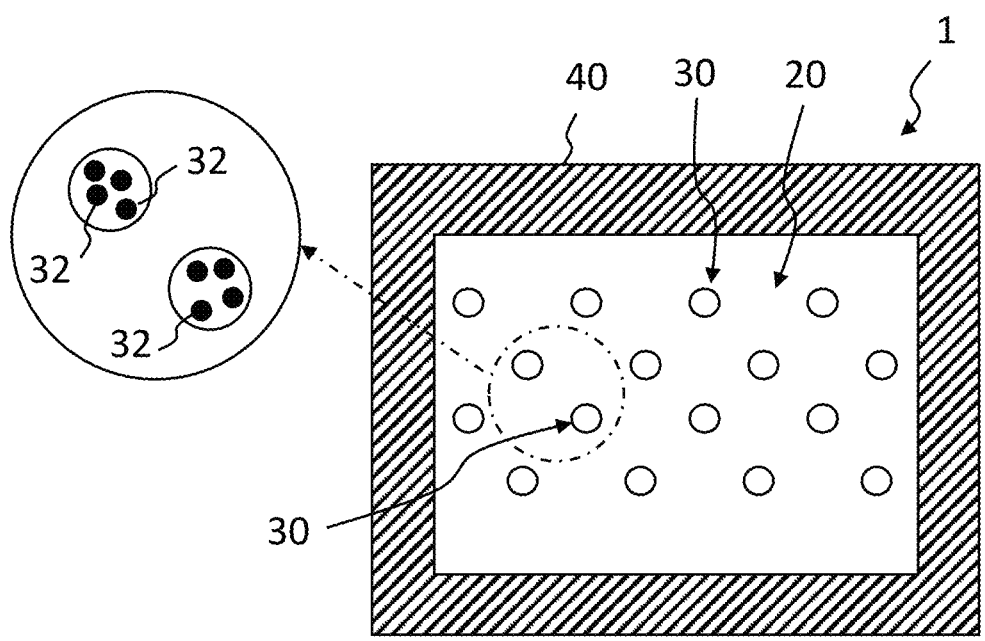
FIG. 2 is a top view of a device.

FIG. 2 illustrates a top view of a device 1. As illustrated, the metal cathode 20 may be a metal layer on top of the surface 11 of the semiconductor structure 10. The metal layer may comprise holes in which the photoanodes 30 are arranged on the surface 11 of the semiconductor structure 10. Within each photoanode 30 there may be a plurality of quantum dots 32, as illustrated in the figure inset. The photoanodes 30 do not necessarily need to be arranged within holes of the metal cathode 20. Other configurations may be used. For example, a photoanode 30 and a metal cathode 20 may form an interdigital structure, as illustrated in the top view of a device 1 in FIG. 3. Herein, the photoanode 30 and the metal cathode 20 may be comb shaped, wherein the comb shapes interlock to form the interdigital structure.

The device 1 may be configured such that the distance from the quantum dots 32 of the photoanodes 30 to a metal cathode 20 is small. Each quantum dot 32 of the at least one photoanode 30 may represent a shortest QD-to-cathode distance, the shortest QD-to-cathode distance being a shortest distance from the quantum dot to the nearest metal cathode 20 of the at least one metal cathode 20. The device 1 may be configured such that an average of the shortest QD-to-cathode distances of the quantum dots 32 of the at least one photoanode 30 is 10 nm or less. For example, in FIG. 2 the holes in the metal cathode, in which the photoanodes 30 are arranged, may have a diameter of 10 nm or 20 nm. If the holes have a diameter of 20 nm, the shortest QD-to-cathode distance for the quantum dots 32 may be up to 10 nm, i.e. for a quantum dot in the center of a hole. Thus, the holes may have a diameter larger than 20 nm and still fulfill a requirement of the average of the shortest QD-to-cathode distances of the quantum dots 32 of the at least one photoanode 30 being 10 nm or less. Similarly, in FIG. 3 the separation between two neighboring teeth in the comb shape of the metal cathode 20 may be 20 nm. Then the shortest QD-to-cathode distance for the quantum dots 32 may be up to 10 nm, i.e. for a quantum dot 32 centered between the two neighboring teeth in the comb shape of the metal cathode 20. Again, the separation between two neighboring teeth may be larger than 20 nm and still fulfill a requirement of the average of the shortest QD-to-cathode distances of the quantum dots 32 of the at least one photoanode 30 being 10 nm or less.

Figure 3:
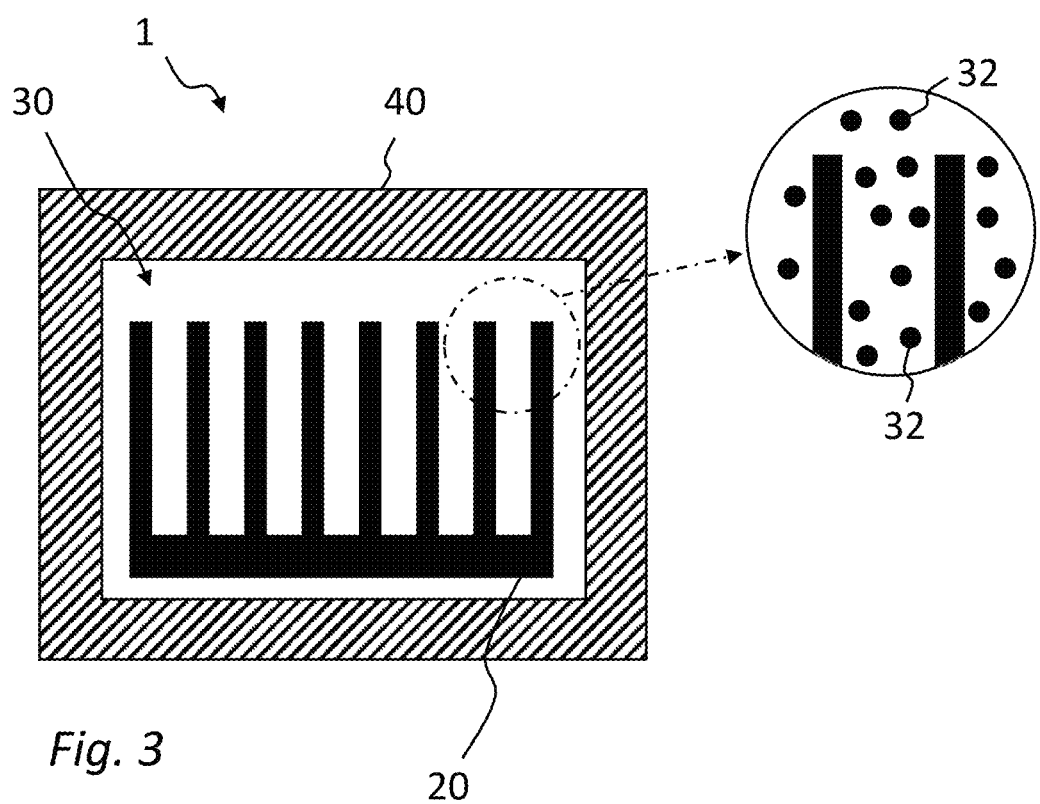
FIG. 3 is a top view of a device.

The device 1 may further comprise a metal contact 40, as illustrated in FIG. 1-3. The device 1 may herein be configured to apply a first electrical potential to the at least one photoanode 30 via the metal contact 40, and to apply a second electrical potential to the at least one metal cathode 20, the first and second potential being different. The metal contact 40 may herein be connected to a voltage source providing the first electrical potential. The at least one metal cathode 20 may herein be connected to a voltage source providing the second electrical potential. For example, the metal contact 40 and the metal cathode 20 may be connected to different terminals of the same voltage source, the voltage source providing a potential difference between the terminals.

The metal contact 40 may comprise a nickel-gold-alloy. Further, the metal contact 40 may be configured to make ohmic contact to the semiconductor structure 10, e.g. by thermally annealing the metal contact 40.

The at least one metal cathode 20 may comprise nickel. Alternatively, or additionally, the at least one metal cathode 20 may comprise palladium.

Figure 4:
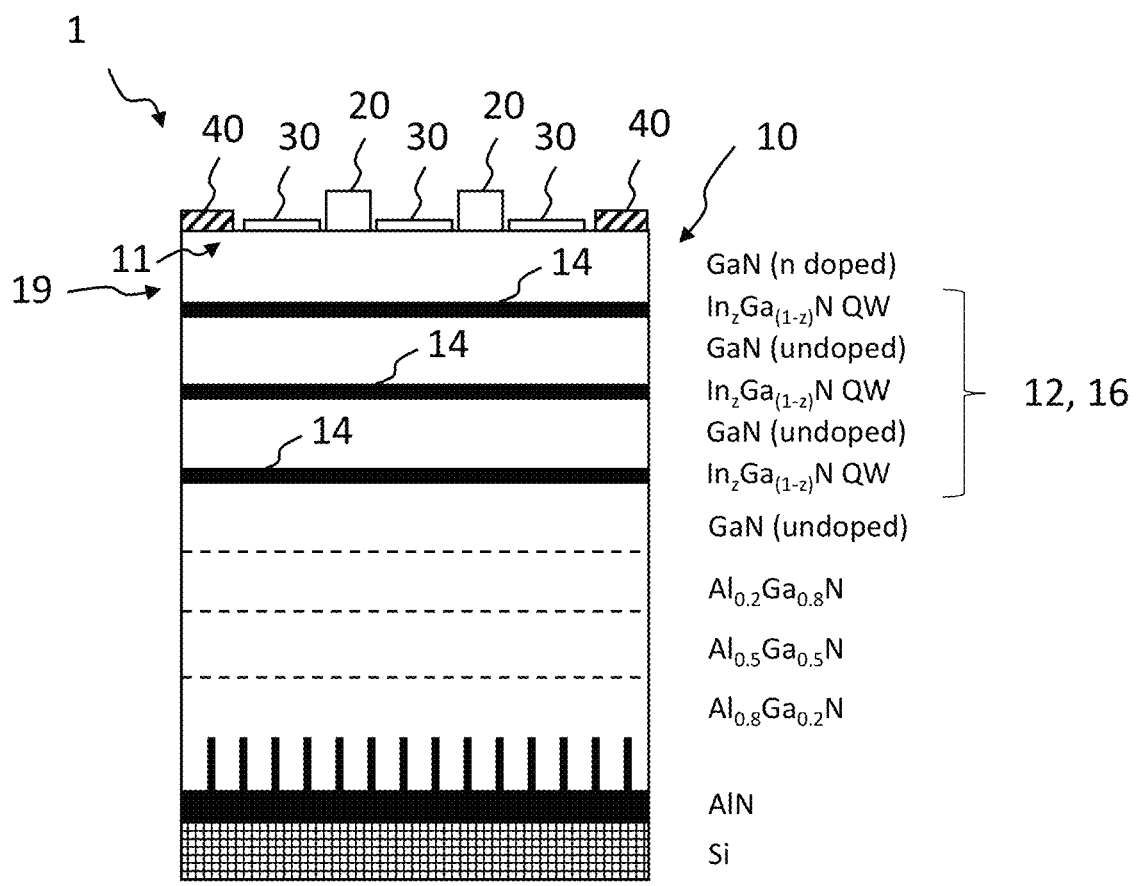
FIG. 4 is a cross-sectional view of a device.
Figure 5:
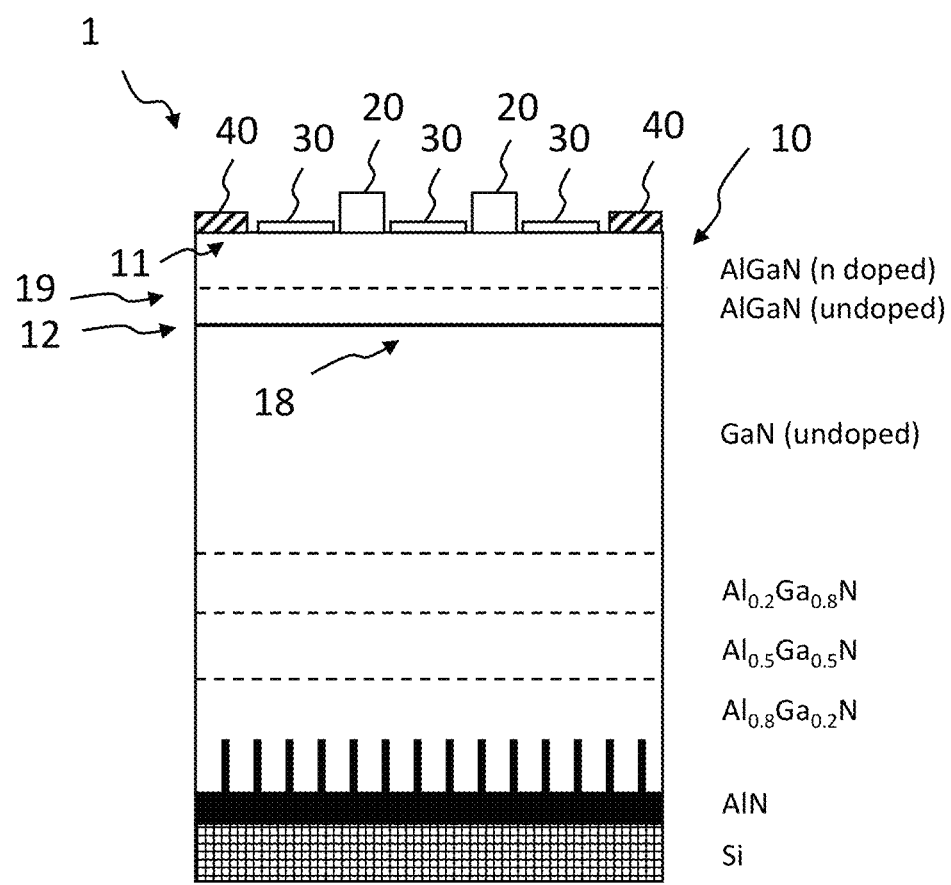
FIG. 5 is a cross-sectional view of a device.

FIGS. 4 and 5 illustrates cross-sectional views of two different devices 1. As illustrated in FIG. 4-5, the semiconductor structure 10 may comprise a plurality of semiconductor layers. The material of the respective layer is indicated to the right in the figures. Herein, Si stands for silicon, AlN stands for aluminum nitride, GaN stands for gallium nitride, InGaN stands for indium gallium nitride, and AlGaN stands for aluminum gallium nitride. Subscripts may indicate the composition in the case of ternary compounds. The doping of the respective layer is indicated in parenthesis for some layers. In the figures, the layers are either n doped or undoped. Layers which are quantum wells are marked QW.

As illustrated in the figures, a layer sequence from bottom to top may be: a silicon layer, an AlN layer, an $Al_{0.8}Ga_{0.2}N$ layer, an $Al_{0.5}Ga_{0.5}N$ layer, an $Al_{0.2}Ga_{0.8}N$ layer, an GaN layer, an electron guiding layer 12, and a GaN layer. The layer sequence: silicon layer, AlN layer, $Al_{0.8}Ga_{0.2}N$ layer, $Al_{0.5}Ga_{0.5}N$ layer, $Al_{0.2}Ga_{0.8}N$ layer; may enable epitaxial growth of the subsequent GaN layer. Alternatively, a substrate providing a GaN surface may be used. The illustrated layer sequence may enable GaN growth using cheap substrates. The Si layer may herein be a Si substrate or wafer, which may be cheap compared to alternative substrates. The AlN layer, $Al_{0.8}Ga_{0.2}N$ layer, $Al_{0.5}Ga_{0.5}N$ layer, and $Al_{0.2}Ga_{0.8}N$ layer may collectively form a buffer layer enabling GaN epitaxial growth with sufficiently low defect density. The AlN layer may be a layer of AlN sputtered on the silicon substrate. As illustrated, the AlN layer may comprise AlN pillars. The pillars may be formed by lithographically patterning a flat AlN layer and partially removing AlN material by plasma etching to form separate pillars. On top of the AlN layer a sequence of layers may follow wherein the composition of the group III material gradually changes from aluminum rich to gallium rich. In the illustration the layers $Al_{0.8}Ga_{0.2}N$ layer, $Al_{0.5}Ga_{0.5}N$ layer, and $Al_{0.2}Ga_{0.8}N$ gradually changes the group III material composition from 80% Al:20% Ga, to 50% Al:50% Ga, to 20% Al:80% Ga. The gradual change in aluminum and gallium composition may of course be done over fewer or more layers than three. Different aluminum and gallium compositions than the ones in this example may of course be used.

The electron guiding layer 12 may comprise an InGaN quantum well 14. FIG. 4 illustrates a device 1 wherein the electron guiding layer 12 comprises a superlattice 16 of InGaN quantum wells 14. An InGaN quantum well 14 of the electron guiding layer 12 may have a composition of $In_zGa_{(1-z)}N$, wherein $x \leq z$. Thus, the InGaN quantum well 14 of the electron guiding layer 12 of the semiconductor structure 10 may be richer in indium than the plurality of quantum dots 32 of the at least one photoanode 30. An InGaN quantum well 14 of the electron guiding layer 12 may have a thickness between 1 nm and 7 nm. The device 1 may be configured to provide quantized energy states in the electron guiding layer 12. The device 1 may be configured such that the lowest quantized energy state of the electron guiding layer 12 is of lower energy than the lowest energy state of a quantum dot 32 of the plurality of quantum dots 32 of the photoanode 30. The device 1 may be configured such that, when the device 1 is in operation, it is energetically favorable for a charge carrier, e.g. an electron, to move from the quantum dot 32 to the electron guiding layer 12, e.g. quantum mechanically tunnel from the quantum dot 32 to the electron guiding layer 12. Thus, the composition and thickness of one or all $In_zGa_{(1-z)}N$ quantum wells 14 of the electron guiding layer 12 may be configured in relation to the composition and size of the plurality of quantum dots 32 of the photoanode 30 such that, when the device 1 is in operation, it is energetically favorable for a charge carrier, e.g. an electron, to move from the quantum dot 32 to the electron guiding layer 12.

Neighboring InGaN quantum wells 14 of the electron guiding layer 12 may, as illustrated in FIG. 4, be separated by semiconductor barrier material with a bandgap larger than the bandgap of the neighboring InGaN quantum wells 14. In FIG. 4 the semiconductor barrier material is GaN. Alternatively, another semiconductor barrier material may be used, e.g. InGaN semiconductor barrier material, wherein the indium content of the InGaN barrier material is lower than the indium content of the InGaN quantum wells 14. The separation of neighboring InGaN quantum wells 14 of the electron guiding layer 12 may be sufficiently small to provide efficient quantum mechanical coupling between the neighboring InGaN quantum wells 14. The separation, i.e. the thickness of the barrier material between the neighboring InGaN quantum wells 14 may be below 10 nm, such as below 5 nm, such as below 3 nm.

The InGaN quantum well 14 or quantum wells 14 of the electron guiding layer 12 may be configured to provide a 2DEG in the electron guiding layer 12 of the semiconductor structure 10.

FIG. 5 illustrates an alternative to the electron guiding layer 12 comprising an InGaN quantum well 14. In FIG. 5 the electron guiding layer 12 comprises an AlGaN/GaN heterojunction 18, the AlGaN/GaN heterojunction 18 being a junction between AlGaN material and GaN material. The AlGaN/GaN heterojunction 18 may be configured to provide a 2DEG in the electron guiding layer 12 of the semiconductor structure 10.

As illustrated in FIGS. 4 and 5, a barrier layer 19 may be arranged between the electron guiding layer 12 and the surface 11 of the semiconductor structure 10. In FIG. 4 the barrier layer 19 comprises GaN and in FIG. 5 the barrier layer 19 comprises AlGaN. The barrier layer 19 may separate the electron guiding layer 12 from the photoanodes 30 and the metal cathodes 20. The barrier layer 19 may be configured such that charge carriers, e.g. electrons, may pass between a photoanode 30 and the electron guiding layer 12 through quantum mechanical tunneling. Similarly, the barrier layer 19 may be configured such that charge carriers, e.g. electrons, may pass between the electron guiding layer 12 and a metal cathode 30 through quantum mechanical tunneling. The barrier layer 19 may be configured to provide an energy barrier to charge carriers, e.g. electrons, confined in quantum dots 32 of the photoanode 30. Additionally, or alternatively, the barrier layer 19 may be configured to provide an energy barrier to charge carriers, e.g. electrons, confined in the electron guiding layer 12. The barrier layer 19 may have a thickness configured to provide a sufficient tunneling rate for the electrolysis process. Thus, the barrier layer 19 may have a thickness below 10 nm, such as below 5 nm, such as below 3 nm.

As illustrated in FIGS. 4 and 5, the top semiconductor layer of the semiconductor structure 10, i.e. the semiconductor layer in contact with the at least one metal cathode 20 and the at least one photoanode 30, may be doped, e.g. n doped. Increasing the electron mobility of the top semiconductor layer may facilitate transport of electrons from the at least one photoanode 30 to the electron guiding layer 12 and from the electron guiding layer 12 to the at least one metal cathode 20. Doping of the top semiconductor layer may facilitate the application of a first electrical potential to the at least one photoanode 30 via the metal contact 40.

Figure 6:
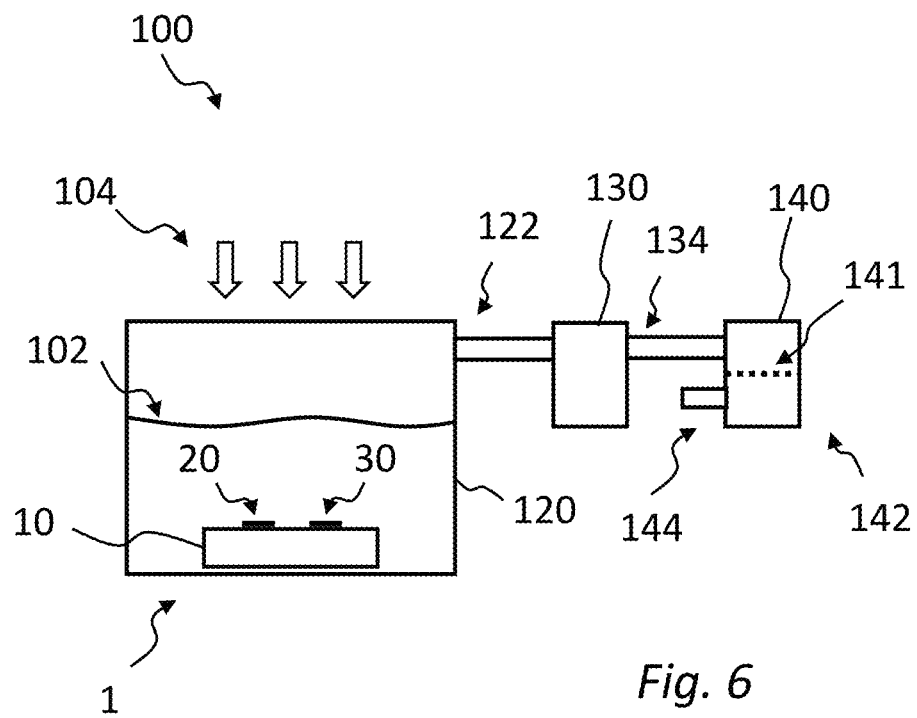
FIG. 6 illustrates a system.

FIG. 6 illustrates a system 100 comprising a device 1 as previously described. The system 100 further comprises a container 120 configured to hold water 102, wherein the container 120 comprises a gas outlet 122. In FIG. 6 the container holds water 102.

As illustrated, the device 1 and the container 120 are arranged such that when the container 120 holds the water 102, the at least one metal cathode 20 and the at least one photoanode 30 of the device 1 are immersed in the water 102. In FIG. 6 the entire semiconductor structure 10 is immersed in the water 102. However, the device 1 may alternatively be arranged in other ways. For example, the surface 11 of the semiconductor structure 10, with the at least one metal cathode 20 and the at least one photoanode 30, may form part of a wall of the container, e.g. part of the bottom of the container. The illustrated system 100 is illuminated by sunlight 104. The container 120 may be configured to transmit sunlight 104 to the at least one photoanode 30. For example, a part of a wall of the container 120, e.g. a top part of the container 120, may be at least partially transparent to sunlight 104.

The system 100 is configured such that when the device 1 is in operation, and the at least one metal cathode 20 and the at least one photoanode 30 of the device 1 are immersed in the water 102 and illuminated by sunlight 104, a gas mixture flow is presented at the gas outlet 122 of the container 120. Oxygen gas may form at the at least one photoanode 30, and hydrogen gas may form at the at least one metal cathode 20. The gases may mix and be collected in the container 120, e.g. by the container 120 being closed at the top to prevent the gases from escaping upwards. The gas outlet 122 of the container 120 may be arranged above the water 102 such that the collected gases flows out of the gas outlet 122 as a gas mixture flow.

The illustrated system 100 further comprises a gas filter 130 configured to: receive the gas mixture flow from the gas outlet 122 of the container 120; filter the gas mixture flow into a hydrogen gas flow; and present the hydrogen gas flow at a hydrogen outlet 134 of the gas filter 130.

The gas filter 130 may receive the gas mixture flow from the gas outlet 122 of the container 120 via a gas pipe connecting the gas outlet 122 of the container 120 with the gas filter 130, as illustrated.

The illustrated system 100 further comprises a fuel cell 140 configured to: receive the hydrogen gas flow from the hydrogen outlet 134 of the gas filter 130; and react the received hydrogen gas flow with oxygen to generate an electrical current.

The fuel cell 140 may receive the hydrogen gas flow from the hydrogen outlet 134 of the gas filter 130 via a gas pipe connecting the hydrogen outlet 134 of the gas filter 130 with the fuel cell 140, as illustrated.

The oxygen used in the reaction in the fuel cell 140 may be taken from air, e.g. air from an air inlet 144 as illustrated in FIG. 6.

Figure 7:
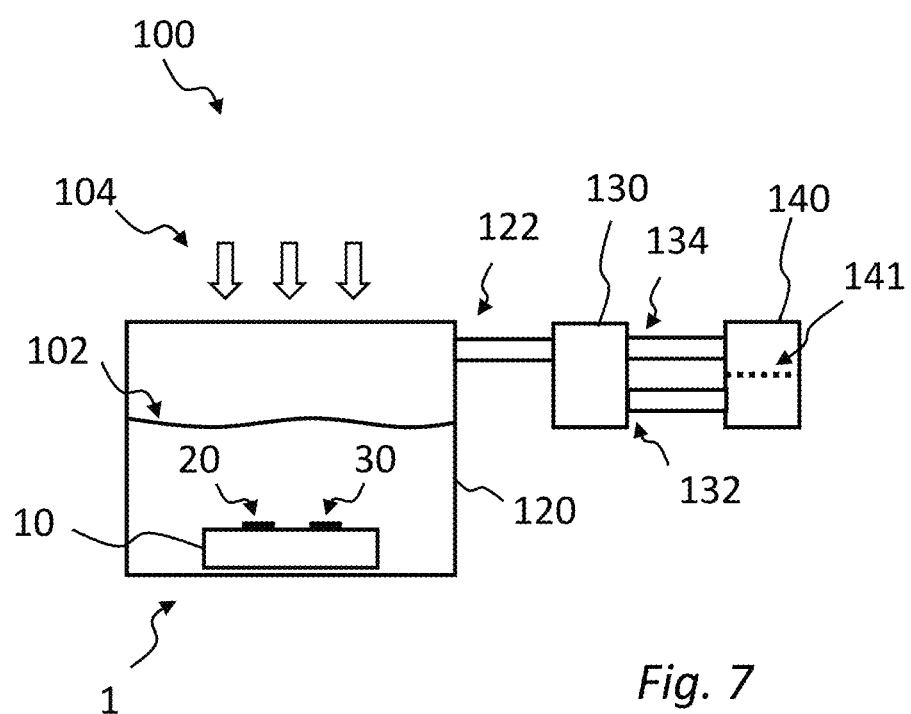
FIG. 7 illustrates a system.

FIG. 7 illustrates a system 100 configured to filter out both oxygen and hydrogen from the gas mixture flow and react the filtered-out hydrogen with the filtered-out oxygen in the fuel cell 140. Such a system 100 may be used as an alternative to the system 100 in FIG. 6. The system comprises a gas filter 130 configured to: receive the gas mixture flow from the gas outlet 122 of the container 120; filter the gas mixture flow into an oxygen gas flow and a hydrogen gas flow; and present the oxygen gas flow at an oxygen outlet 132 of the gas filter 130 and present the hydrogen gas flow at a hydrogen outlet 134 of the gas filter 130.

The system further comprises a fuel cell 140 configured to: receive the oxygen gas flow from the oxygen outlet 132 of the gas filter 130; receive the hydrogen gas flow from the hydrogen outlet 134 of the gas filter 130; and react the received hydrogen gas flow with oxygen from the received oxygen gas flow to generate the electrical current.

The gas filter 130 may e.g. be a pressure swing adsorption filter. The pressure swing adsorption filter may comprise an adsorbent material, e.g. zeolites or molecular sieves. The pressure swing adsorption filter may alternate between a high- and a low-pressure phase. The received gas mixture flow may enter the pressure swing adsorption filter at high pressure in the high-pressure phase. The adsorbent material may then adsorb one gas component of the gas mixture flow, e.g. adsorb oxygen. The other gas component of the gas mixture flow, e.g. hydrogen, may pass through the filter to the corresponding outlet, in this example to the hydrogen outlet 134. Thus, the hydrogen may be presented as the hydrogen gas flow at the hydrogen outlet 134 of the gas filter 130.

The pressure swing adsorption filter may be configured to change the pressure in the gas filter 130 to a low pressure in a low-pressure phase to release the adsorbed gas. In a system 100 such as the one illustrated in FIG. 7 both the gas from the high-pressure phase and the low-pressure phase of the pressure swing adsorption filter may be directed to the fuel cell 140. Continuing on the previous example with oxygen being adsorbed, the hydrogen outlet 134 and the inlet for the gas mixture flow may be closed during the low-pressure phase such that the released oxygen is presented as the oxygen gas flow at the oxygen outlet 132 of the gas filter 130 in FIG. 7. If the fuel cell 140 does not use oxygen from the gas filter 130, such as in the system 100 illustrated in FIG. 6, the pressure swing adsorption filter may release the oxygen in the low-pressure phase to an exhaust.

The fuel cell 140 may be a proton-exchange membrane fuel cell comprising a proton-exchange membrane 141. As illustrated in FIGS. 6 and 7, hydrogen gas flow from the hydrogen outlet 134 of the gas filter 130 may enter the fuel cell 140 on one side of the proton-exchange membrane 141. Oxygen, e.g. from an air inlet 144 (as illustrated in FIG. 6) or received as an oxygen gas flow from the oxygen outlet 132 of the gas filter 130 (as illustrated in FIG. 7) may enter the fuel cell 140 on the other side of the proton-exchange membrane 141.

At the hydrogen side of the proton-exchange membrane 141 H$^+$ ions (protons) and electrons may be formed. The protons may pass through the proton-exchange membrane 141 while the electrons may travel through an external load circuit. At the oxygen side of the proton-exchange membrane 141, oxygen and protons that has passed through the proton-exchange membrane 141 and electrons that have travelled through the external load circuit may react to form water. Thus, the received hydrogen gas flow may react with oxygen to generate the electrical current in the external load circuit.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for performing electrolysis of water, the device comprising:
   a semiconductor structure comprising a surface and an electron guiding layer below said surface, the electron guiding layer of the semiconductor structure being configured to guide electron movement in a plane parallel to the surface, the electron guiding layer of the semiconductor structure comprising an InGaN quantum well or a heterojunction, the heterojunction being a junction between AN material and GaN material or between AlGaN material and GaN material;
   at least one metal cathode arranged on the surface of the semiconductor structure; and
   at least one photoanode arranged on the surface of the semiconductor structure, wherein the at least one photoanode comprises a plurality of quantum dots of InxGa(1-x)N material, wherein $0.4 \leq x \leq 1$.

2. The device according to claim 1, further comprising a metal contact, wherein the device is configured to apply a first electrical potential to the at least one photoanode via the metal contact, and to apply a second electrical potential to the at least one metal cathode, the first and second potential being different.

3. The device according to claim 2, wherein the metal contact comprises a nickel-gold-alloy and is configured to make ohmic contact to the semiconductor structure.

4. The device according to claim 1, wherein each quantum dot of the at least one photoanode represents a shortest QD-to-cathode distance, the shortest QD-to-cathode distance being a shortest distance from the quantum dot to the nearest metal cathode of the at least one metal cathode, wherein an average of the shortest QD-to-cathode distances of the quantum dots of the at least one photoanode is 10 nm or less.

5. The device according to claim 1, wherein the at least one metal cathode comprises nickel.

6. The device according to claim 1, wherein the at least one metal cathode comprises palladium.

7. The device according to claim 1, wherein the electron guiding layer of the semiconductor structure comprises a superlattice of InGaN quantum wells, each InGaN quantum well of the superlattice having a bandgap, wherein the InGaN quantum wells of the superlattice are separated by semiconductor barrier material with a bandgap larger than the bandgap of the InGaN quantum wells of the superlattice.

8. The device according to claim 1, wherein the electron guiding layer of the semiconductor structure comprises an InGaN quantum well with a thickness between 1 nm and 7 nm.

9. The device according to claim 1, wherein the device is configured to provide a two-dimensional, 2D, electron gas in the electron guiding layer of the semiconductor structure.

10. A system, the system comprising:
    a device according to claim 1;
    a container configured to hold water, the container comprising a gas outlet, wherein the device and the container are arranged such that when the container holds the water, the at least one metal cathode and the at least one photoanode of the device are immersed in the water, wherein the system is configured such that when the device is in operation, and the at least one metal cathode and the at least one photoanode of the device are immersed in the water and illuminated by sunlight, a gas mixture flow is presented at the gas outlet of the container, wherein the gas mixture flow comprises oxygen gas and hydrogen gas from the electrolysis of water performed by the device;

the system further comprising a gas filter configured to:

receive the gas mixture flow from the gas outlet of the container;

filter the gas mixture flow into a hydrogen gas flow; and present the hydrogen gas flow at a hydrogen outlet of the gas filter; and the system further comprising a fuel cell configured to:

receive the hydrogen gas flow from the hydrogen outlet of the gas filter; and react the received hydrogen gas flow with oxygen to generate an electrical current.

11. The system according to claim 10, wherein the gas filter is a pressure swing adsorption filter.

12. The system according to claim 10, wherein the fuel cell is a proton-exchange membrane fuel cell.

13. The system according to claim 10, wherein the at least one metal cathode comprises nickel.

14. The system according to claim 10, wherein the at least one metal cathode comprises palladium.

15. The system according to claim 10, wherein each quantum dot of the at least one photoanode represents a shortest QD-to-cathode distance, the shortest QD-to-cathode distance being a shortest distance from the quantum dot to the nearest metal cathode of the at least one metal cathode, wherein an average of the shortest QD-to-cathode distances of the quantum dots of the at least one photoanode is 10 nm or less.

16. The system according to claim 10, wherein the electron guiding layer of the semiconductor structure comprises an InGaN quantum well with a thickness between 1 nm and 7 nm.

* * * * *

UNITED STATES PATENT AND TRADEMARK OFFICE
CERTIFICATE OF CORRECTION

PATENT NO. : 11,634,824 B2
APPLICATION NO. : 17/835804
DATED : April 25, 2023
INVENTOR(S) : Martin Andreas Olsson It is certified that error appears in the above-identified patent and that said Letters Patent is hereby corrected as shown below:

On the Title Page

On Page 2, Column 2, Line 37, under Other Publications, delete "Arbitrart" and insert --Arbitrary--.

In the Specification

In Column 9, Line 64, delete "FIG." and insert --FIGS.--.

In Column 10, Line 18, delete "FIG." and insert --FIGS.--.

In the Claims

In Column 14, Claim 1, Line 21, delete "AN" and insert --AlN--.

In Column 14, Claim 1, Line 28, delete "InxGa(1-x)N" and insert --$In_xGa_{(1-x)}N$--.

Signed and Sealed this
Fifth Day of September, 2023

Katherine Kelly Vidal
*Director of the United States Patent and Trademark Office*